3,340,233
BIS-VINYLKETO AROMATIC COMPOUNDS AND
POLYMERIZATION PRODUCTS THEREOF
Frederick C. Leavitt, Midland, Mich., assignor to The
Dow Chemical Company, Midland, Mich., a corporation of Delaware
No Drawing. Filed July 22, 1963, Ser. No. 296,441
20 Claims. (Cl. 260—62)

This invention relates to bis-vinylketo aromatic compounds. More specifically, it relates to such compounds having at least two phenyl nuclei with a vinylketo radical on two phenyl nuclei. This invention is also directed to polymerization products of such compounds, including various copolymerization products in which these compounds serve as crosslinking agents.

The new compounds of this invention have particular and effective utility as crosslinking agents for vinyl and vinylidene polymers which are generally formed by free radical polymerizations. These compounds have been found to be extremely reactive toward free radicals. Because of the high degree of reactivity of the vinyl keto group and the lack of steric interference toward reaction of the second vinyl keto group after the first is incorporated in the polymer chain, these compounds are found to be even more effective as crosslinking agents than compounds presently used for such purposes such as divinyl benzene, vinyl methacrylate, ethylene glycol diacrylate, etc.

The bis-vinylketo aromatic compounds of this invention can be represented by the formulas

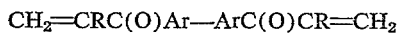

and

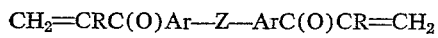

wherein Ar represents a phenylene nucleus having thereon no more than one substituent other than those indicated in the formula and such other substituents being selected from the class of alkyl groups of no more than 8 carbon atoms, chlorine, hydroxy, and alkoxy radicals of no more than 8 carbon atoms, R represents hydrogen and methyl, and Z represents an alkylene radical of no more than 10 carbon atoms, the Ar radical, —O—, —S— and —(CO)— radicals. The alkylene radicals include cycloalkylene radicals and aliphatic ring structures in which two members of the ring are common to one of the phenylene radicals, such as in the indane structure.

Typical aromatic starting materials on which these bisvinylketo groups can be substituted on separate phenylene portions include but are not restricted to: diphenyl, diphenyl methane, diphenyl oxide, diphenyl sulfide, diphenyl ethane, 1-methyl-3-phenyl indane, 1,3-diphenyl butene-1, diphenyl octane, diphenyl ketone, diphenyl hexane, triphenyl, triphenyl methane, phenyl toluene, benzyl toluene, diphenyl butane, octyl diphenyl, dibutyl diphenyl, etc.

The bis-vinylketo compounds of this invention are advantageously prepared by acylation of the aromatic nuclei, such as in the compounds listed above, with a β-chloropropionyl chloride, α-Cl-propionyl chloride or the corresponding Br or I derivatives, followed by dehydrohalogenation to give the vinylketo derivatives. While other methods can be used to prepare these compounds, this preferred method gives excellent yields of the desired compounds. Because of the bulk of the acylating radical, there is very little di-substitution on the same phenylene nucleus and therefore substitution on a second phenylene nucleus can be effected without over acylation of the same nucleus. Since this permits the use of excess acylating agents to assure a diacylation, the production of any considerable amount of monoacylated product can be avoided.

While it might be expected that a certain amount of alkylation would be effected through the halogen in the α or β positions of the acylating agent in the presence of AlCl₃, it has been found that due to the greater reactivity of the acyl halide, it is possible to selectively acylate without simultaneously effecting any substantial amount of alkylation through the α or β halogen. This side reaction is also minimized or avoided completely by using relatively dilute solutions of the aromatic starting compound. It is generally preferred to use solutions or suspensions containing no more than about 40% of aromatic compound based on the combined weight of compound and solvent or suspension medium. This side reaction is further minimized by operating at temperatures in the range of 0 to 80° C. Preferred temperatures are approximately room temperature and ambient temperatures.

Where the higher temperatures are used, it is generally advantageous to favor minimizing the alkylation side reaction by avoiding the use of excessive amounts of AlCl₃. Where the preferred range of temperatures or even lower temperatures are used, the proportion of AlCl₃ can be as much as 1.5 moles per mole of acylating agent. With the higher temperatures, it is advantageous to use approximately 1 mole of AlCl₃ per mole of acylating agent. In instances where such reaction is found to occur, this can be avoided by using a greater amount of acylating agent than actually desired to be attached to the polymer, and then using a molar proportion of AlCl₃ which will correspond to the desired degree of substitution. In this way, if any additional reaction occurs, it is in the manner of a greater degree of mono-substitution than in a double reaction of the same molecule of acylating agent.

Since yields of 90% of theoretical of the acylation group are generally effected based on the amount of acylating agent used, it is possible to calculate the amount of acylating agent to use for obtaining the desired degree of substitution without any undesired side alkylation. The proportion of acylating agent to be used depends on the degree of substitution desired in the resultant polymeric product.

Obviously, however, if less than a mole per mole basis of AlCl₃ is used, the degree of acylation effected will be decreased accordingly. While acylation can be effected in corresponding amount with as little as 0.1 mole of AlCl₃ per mole of acylating agent, it is generally preferred to use mole per mole or even a slight excess of AlCl₃.

The dehydrohalogenation is promoted by the use of any appropriate hydrogen halide acceptor. Generally, the strong alkalis are not desirable since they promote polymerization of the ultimate vinyl keto groups, particularly when higher temperatures are used in this reaction. Typical alkaline materials which are preferred as hydrogen halide acceptors in the practice of this invention include, but are not restricted to: alkali and alkaline earth metal salts of carboxylic acids, such as sodium acetate, potassium acetate, sodium propionate, sodium benzoate, lithium benzoate, lithium propionate, sodium hexoate, calcium benzoate, calcium acetate, barium acetate, etc.; the alkali and alkaline earth metal salts of weak inorganic acids, such as sodium borate, sodium phosphate, potassium bicarbonate, sodium carbonate, etc.; and the tertiary amines, such as trimethyl amine, triethyl amine, pyridine, tribenzyl amine, dimethylbenzyl amine, dimethyl aniline, etc.

It is generally desirable to have excess of such base present in order to absorb the hydrogen halide quickly and completely. The dehydrogenation reaction is generally easily effected for substantially complete removal of the halogen atom which is split out in the formation of the double bond. However, when a vinyl group is formed which still has a chlorine atom attached thereto, this remaining chlorine atom is not disturbed since it is difficult to remove a chlorine from a vinyl group.

In conducting the dehydrohalogenation reaction, the rate of reaction increases with the temperature. However, as explained above, it is desirable to avoid the use of exceedingly high temperatures so as to avoid the possibility of polymerization through the vinyl group, particularly with more active groups, such as the acrylyl group. Generally, however, temperatures as high as 65° C. can be used without any such difficulties.

The invention is best illustrated by the following examples. These examples are given merely as illustrations and are not intended to limit the scope of the invention nor the manner in which it can be practiced. Unless specifically indicated otherwise, parts and percentages are given as parts and percentages by weight respectively.

*Example I*

Under anhydrous conditions, 61.5 parts of anhydrous $AlCl_3$ is added slowly with stirring over a period of 1¼ hours to a reaction flask maintained under anhydrous conditions and containing 30 parts of biphenyl, 41 parts of β-chloropropionyl chloride and 150 parts of methylene chloride. The temperature is maintained in the range of 10–15° C. during the addition. Then the solution is warmed to 22° C. and stirring continued for an additional 3¼ hours. The product is thereafter hydrolyzed in cold dilute HCl. The resultant organic layer is separated and dried over anhydrous $MgSO_4$. Methanol is added and a precipitate of 26.8 parts is obtained. This product has a melting point of 163° C. and represents a 47.5% yield of the compound found to be p,p′-bis(β-chloropropionyl)-diphenyl.

*Example II*

The compound prepared in Example I is dehydrohalogenated by placing 4.5 parts of this product in 100 parts of 95% ethanol and 50 parts of tetrahydrofurane, together with five parts of potassium acetate. This mixture is heated to reflux for two hours, then cooled to room temperature and added to at least 20 times its volume of water. The resultant precipitated light yellow solid is recrystallized from an equal volume mixture of methylene chloride and methanol. The light yellow crystalline solid obtained upon recrystallization, which is identified as p,p′-bis-acrylyl diphenyl softens and polymerizes at 118° C.

*Example III*

The compound of Example II is used to crosslink styrene by mixing such compound with styrene and azobis-isobutyronitrile in the proportion of 3.95 moles of this compound, 34.8 moles of styrene and .003 mole of azobis-isobutyronitrile under a nitrogen atmosphere. The solution is heated to 60° C. and is found to gel after 45 minutes.

*Example IV*

The procedures of Examples I and II are repeated using an equivalent amount of 1-methyl-3-phenyl indane. The product obtained has the formula

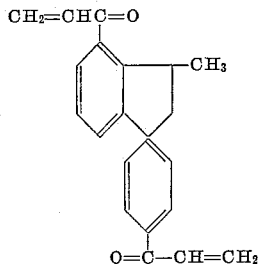

When this compound is tested as a crosslinking agent with styrene as in Example III, the styrene copolymer is gelled very shortly.

*Example V*

The procedures of Examples I and II are repeated using in place of the diphenyl, an equivalent amount of 1,3- diphenyl-butene-1 and the derivative obtained is identified as 1,3-bis(acrylylphenyl)-butene-1. This also acts as an excellent crosslinking agent when tested as in Example III.

*Example VI*

The procedures of Examples I and II are repeated using diphenyl oxide in place of the diphenyl. The resultant bis-vinylketo diphenyl ether has a melting point of 87–88° C.

*Example VII*

The procedures of Examples I and II are repeated a number of times using in place of the diphenyl the following aromatic compounds respectively: diphenyl methane, diphenyl ethane, diphenyl sulfide, diphenyl ketone, 2,3-diphenyl butane, p,p′-dimethyl-diphenyl and chlorodiphenyl, dihydroxy diphenyl, and butyl diphenyl. The following compounds are obtained respectively:

p,p′-Bis-acrylyl diphenylmethane;
p,p′-Bis-acrylyl diphenylethane;
p,p′-Bis-acrylyl diphenylsulfide;
p,p′-Bis-acrylyl diphenylketone;
p,p′-Bis-acrylyl-2,3-diphenyl-butene;
Bis-acrylyl-p,p′-dimethyl-diphenyl;
Bis-acryly-chlorodiphenyl;
Bis-acrylyl-dihydroxy diphenyl; and
Bis-acrylyl-butyl diphenyl.

Upon testing as in Example III, these compounds are found to have similar crosslinking tendencies as shown in Example III.

*Example VIII*

The procedures of Examples I, II, VI and VII are repeated using β-chloro-α-methyl-propionyl chloride and the corresponding α-methyl-acrylyl derivatives are obtained, which also show efficient crosslinking properties.

The conditions suitable for use of these compounds as crosslinking agents are those normally used in any free radical polymerization. The temperature should be sufficient to decompose the catalyst, if any is used, and where no catalyst is used, higher temperatures may be desirable to polymerize the monomeric mixture. The ratio of crosslinking agents to other monomer is determined according to the degree of crosslinking desired, with higher concentrations of the bis-vinylketo compound giving greater degrees of crosslinking. Likewise, the rate of gelation is increased by the concentration of crosslinking agent, although the gelation period is much shorter than in similar reactions using divinylbenzene. For example, styrene monomer copolymerized with 0.1 mole of either p,p′-bis-acrylyl diphenyl or p,p′-bis-acrylyl diphenyloxide gels in 45 minutes as compared to 1½ hours when divinyl benzene is used with similar proportion and conditions.

The following table shows a series of runs in which the copolymerization of methyl methacrylate is effected with ethylene dimethacrylate and bis-vinylketo biphenyloxide respectively using a polymerization temperature of 80° C. and a catalyst concentrate of 0.5% benzoyl peroxide. On the basis of the time required to reach 50% polymer conversion, these results show a much greater efficiency on a molar basis of the bis-vinylketo biphenyloxide (BVKBPO) as compared to the ethylene dimethacrylate (EDM).

TABLE—MONOMER COMPOSITION
[MOLE FRACTIONS]

| MMA | EDM | BVKBPO | Minutes to reach 50% Conversion |
|---|---|---|---|
| 1.0 | 0 | 0 | 42 |
| 0.9884 | 0.0116 | 0 | 29 |
| 0.9681 | 0.0319 | 0 | 17.5 |
| 0.9473 | 0.0527 | 0 | 14 |
| 0.9285 | 0.0715 | 0 | 13 |
| 0.9883 | 0 | 0.0117 | 14.5 |
| 0.9745 | 0 | 0.0255 | 10.3 |
| 0.9468 | 0 | 0.0532 | 9 |

Generally a very small amount of the crosslinking agent is effective for most crosslinking purposes. As little as 0.05% of such crosslinking agent produces noticeable results. However, it is generally desirable to have at least about 0.5% by weight of such compound. In view of the efficient crosslinking effected by these compounds, it is generally not desirable to have more than about 15%, preferably not more than 10%, by weight of such a compound present when its purpose is to serve merely as a crosslinking agent.

The monomers of this invention are effective as crosslinking agents with polymerizable ethylenic compounds, particularly those having a terminal ethylenic group such as $CH_2=C<$. Typical monomers of this structure include, but are not restricted to the following: styrene, vinyltoluene, vinylnaphthalene, chlorostyrene, dichlorostyrene, ethylstyrene, vinyl diphenyl, alpha-methylstyrene, methyl methacrylate, methyl acrylate, acrylonitrile, vinyl chloride, vinylidene chloride, vinyl acetate, vinyl butyrate, vinyl ethyl ether, etc.

While certain features of this invention have been described in detail with respect to various embodiments thereof, it will, of course be apparent that other modifications can be made within the spirit and scope of this invention, and it is not intended to limit the invention to the exact details shown above except insofar as they are defined in the following claims.

The invention claimed is:
1. A bis-vinylketo compound having a formula selected from the class consisting of

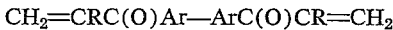
and
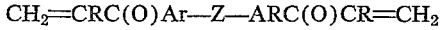

wherein Ar is a phenylene radical having no more than one additional substituent radical thereon and said additional substituent is selected from the class consisting of chlorine, hydroxy, alkyl and alkoxy radicals, said alkyl and alkoxy radicals each having no more than 8 carbon atoms therein; R is a member of the class consisting of hydrogen and the methyl group; and Z represents a radical selected from the class consisting of —O—, —S—, —C(O), and alkylene radicals having no more than 10 carbon atoms therein.

2. p,p'-Bis-acrylyl diphenyl.
3. The compound having the formula

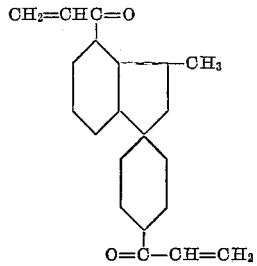

4. 1,3-bis(acrylylphenyl)-butene-1.
5. p,p'-Bis-acrylyl diphenylmethane.
6. p,p'-Bis-acrylyl diphenylethane.
7. p,p'-Bis-acrylyl diphenylsulfide.
8. p,p'-Bis-acrylyl diphenyloxide.
9. A polymer produced by the free-radical polymerization of the compound of claim 1.
10. A polymer produced by the free-radical polymerization of the compound of claim 2.
11. A polymer produced by the free-radical polymerization of the compound of claim 3.
12. A polymer produced by the free-radical polymerization of the compound of claim 4.
13. A copolymer consisting essentially of 99.5–85 percent by weight of styrene and 0.05–15 percent by weight of a compound of claim 1.
14. A copolymer consisting essentially of 99.5–85 percent by weight of styrene and 0.05–15 percent by weight of the compound of claim 2.
15. A copolymer consisting essentially of 99.5–85 percent by weight of styrene and 0.05–15 percent by weight of the compound of claim 3.
16. A copolymer consisting essentially of 99.5–85 percent by weight of styrene and 0.05–15 percent by weight of the compound of claim 4.
17. A copolymer consisting essentially of 99.5–85 percent by weight of styrene and 0.05–15 percent by weight of the compound of claim 5.
18. A copolymer consisting essentially of 99.5–85 percent by weight of styrene and 0.05–15 percent by weight of the compound of claim 6.
19. A copolymer consisting essentially of 99.5–85 percent by weight of styrene and 0.05–15 percent by weight of the compound of claim 7.
20. A copolymer consisting essentially of 99.5–85 percent by weight of styrene and 0.05–15 percent by weight of the compound of claim 8.

References Cited

UNITED STATES PATENTS

| | | | |
|---|---|---|---|
| 2,278,635 | 4/1942 | Barnes | 260—63 |
| 2,445,939 | 7/1948 | Cook et al. | 260—592 |
| 2,465,486 | 3/1949 | Rosenthal | 260—592 |
| 3,242,215 | 3/1966 | Heitmiller | 260—592 |
| 3,285,997 | 11/1966 | Rubens | 260—880 |

OTHER REFERENCES

Morrison and Boyd: Organic Chemistry, Allyn and Bacon, Inc., Boston, Mass., 1962, page 166.

WILLIAM H. SHORT, *Primary Examiner.*

C. A. WENDEL, L. L. LEE, *Assistant Examiners.*